UNITED STATES PATENT OFFICE.

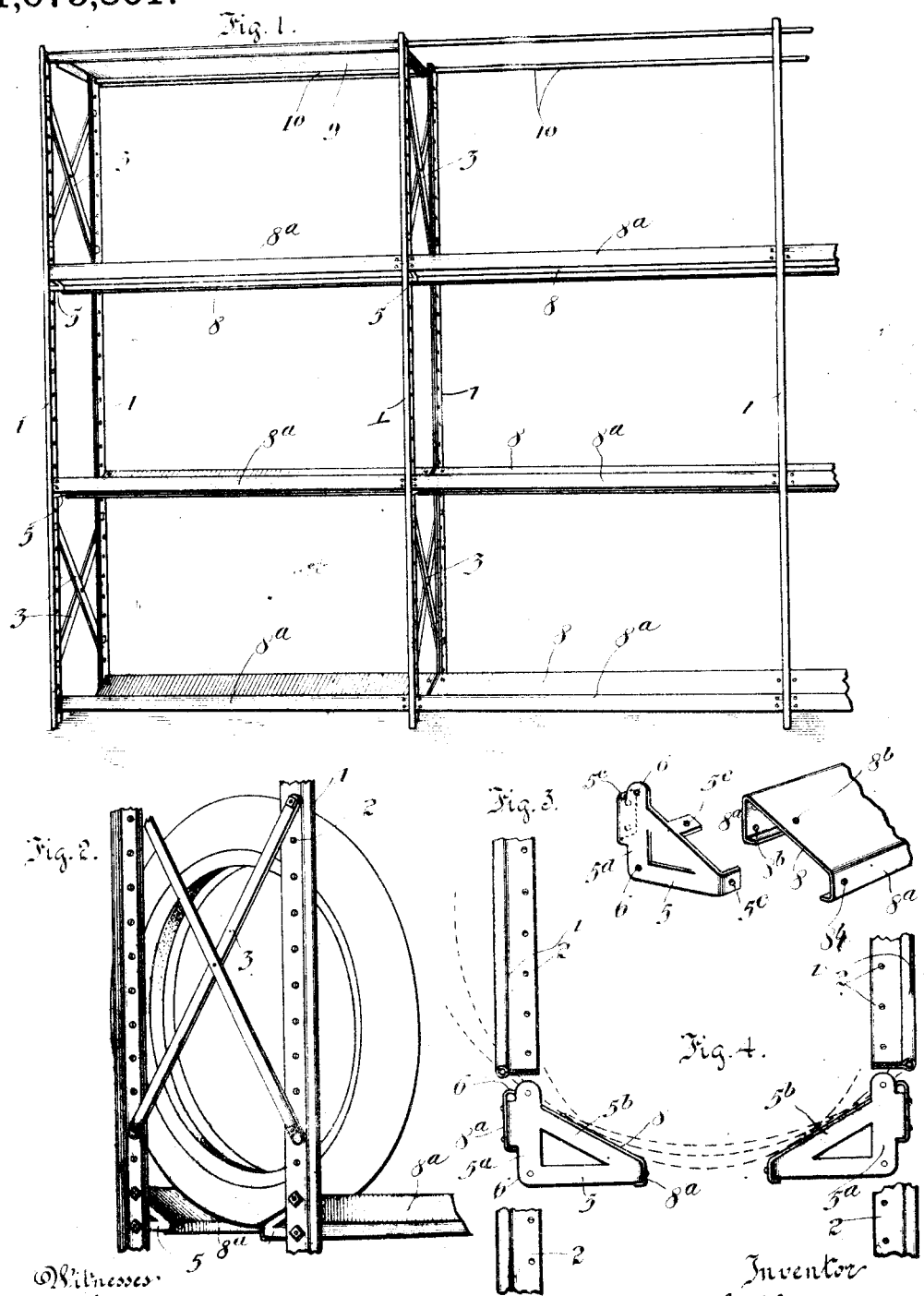

BEVERLY L. WATERS, OF AURORA, ILLINOIS, ASSIGNOR TO LYON METALLIC MANUFACTURING COMPANY, OF AURORA, ILLINOIS, A CORPORATION OF ILLINOIS.

TIRE-RACK.

1,075,801.   Specification of Letters Patent.   Patented Oct. 14, 1913.

Application filed January 30, 1913.   Serial No. 745,103.

*To all whom it may concern:*

Be it known that I, BEVERLY L. WATERS, a citizen of the United States, residing at Aurora, in the county of Kane and State of Illinois, have invented a certain new and useful Improvement in Tire-Racks, of which the following is a specification.

My invention relates to sectional metallic racks more particularly for supporting vehicle tires, such for example as the pneumatic tires used for motor vehicles and the like, and the object of the invention is to produce a light, rigid and simply constructed rack, capable of supporting tires and casings of various sizes and diameters without injury.

It is also my purpose to provide in a rack of this character means whereby the tire supporting members may be readily raised or lowered to adapt the rack to the various sizes of tires to be stored to thereby accommodate the maximum quantity of tires of any given size.

I accomplish my object by the construction illustrated in the accompanying drawings, in which, Figure 1 is a perspective view of a rack embodying my invention. Fig. 2 is a fragmentary perspective view. Fig. 3 is a perspective view showing in detail the shape of the supporting brackets or clips and the tire bars which they carry. Fig. 4 is a detail end view showing the uprights, brackets and tire bars in their relative positions.

Similar numerals refer to similar parts throughout the several views.

The uprights 1 consist of metallic bars having apertures 2 spaced equidistantly. These uprights are suitably secured together in pairs, one in front of the other, preferably by means of cross braces 3. By preference the brackets 5 are approximately triangular in outline, the vertical leg 5ᵃ having two apertures 6, 6 one near the bottom and one near the top. The apertures are so spaced as to register with the apertures 2 in the uprights when the parts are assembled. Each bracket has an oblique leg 5ᵇ extending downward toward the interior of the rack. Each bracket is provided with suitable lugs 5ᶜ for supporting the plates which extend from one upright to another and are so shaped as to form bars for carrying the tires. In the preferred form here shown these tire bars have a central portion 8 and flanges 8ᵃ at the front and rear and have a number of apertures 8ᵇ at each end, registering with apertures in the lugs 5ᶜ so that the brackets and bars may be riveted or otherwise rigidly fastened together. The apertures are so located that there are at least three points of attachment between the tire bar and each bracket, these three points being not in the same straight line. By this means the parts are able to effectually resist racking strains. The central portion 8 of the tire bars is of considerable width and when in position pitches downwardly and inwardly toward the interior of the rack. The result is that a flat surface is afforded for supporting tires of different diameters, as indicated in dotted lines in Fig. 4. On account of the width of this central portion of the bars tires of various diameters will all find flat surfaces to rest upon, thus avoiding damage to the tires even though stored for a considerable period. At the upper end the uprights may be fastened together by any suitable means. I prefer to employ marginally flanged shelves 9 coöperating with tie rods 10. The shelves fit between the uprights and form distance pieces therefor while the tie rods draw the uprights snugly against the ends of the shelves and thereby rigidify the structure.

In assembling the structure the brackets are fastened to the ends of the bars and the brackets are fastened to the uprights. On account of the flanging, the tire bars, although made of comparatively thin sheet metal, exhibit a high degree of rigidity especially after the brackets are secured in place. The brackets, it will be noted, are fastened to the uprights at two different points, one above the other, and hence when two or three bars are in place, the uprights to which they are attached become rigidly fastened together and the result is that the entire structure presents an unexpected degree of rigidity. As the bars extend only up to the upright, a single bar may be removed or adjusted without disassembling the entire rack. For the same reason the number of tire bars may be increased or decreased while the rack is set up and consequently the same upright may be employed for storing a large quantity of small tires or a smaller quantity of large tires.

Attention is called to the fact that all of the parts are interchangeable in the sense that a front upright may be used at the rear of the rack and vice versa, and a bar with its attached brackets may be used either at the front or back of the rack.

As a result of my construction the rack is light, strong, adjustable and expansible, and consists of few parts and is so open that the tires may be readily inserted and withdrawn.

Having thus described my invention, what I claim as new and desire to secure by Letters Patent, is:

1. A tire rack comprising front and rear uprights, tire bars having faces pitching downward and toward each other to thereby afford flat surfaces for supporting tires of different diameters, said bars having marginal flanges at front and rear for stiffening them, and brackets supported upon said uprights and having oblique portions for supporting the pitched portions of said bars.

2. In a tire rack, the combination of uprights having a vertical row of apertures equidistantly spaced, a bracket for each of said uprights, said brackets each having two apertures, one above the other, and adapted to register with apertures in the uprights, whereby the brackets may be bolted to the upright at any desired elevation and be held rigidly thereon, and sheet metal plates extending from one bracket to the next at the front and rear of the rack, said plates each having a main central portion which is flat and extends obliquely downward toward the interior of the rack, said plates having flanges at the front and rear edges substantially as described.

3. In a tire rack, the combination of uprights each having a vertical row of apertures equidistantly spaced, tire bars extending from one upright to the next at the front and at the rear of the rack, said tire bars being formed of sheet metal and having a central portion of substantial width terminating in depending flanges running lengthwise of the bar, and brackets rigidly secured to said bars at at least three points not in the same straight line, said brackets each having a plurality of apertures one above another, registering with the apertures in the uprights, whereby when the parts are fastened together the structure will be prevented from racking.

In witness whereof, I have hereunto subscribed my name in the presence of two witnesses.

BEVERLY L. WATERS.

Witnesses:
ANNA A. FOWLER,
J. B. CASTLE.